United States Patent [19]

Pearl

[11] Patent Number: 4,764,880
[45] Date of Patent: Aug. 16, 1988

[54] COMPOUND PLOTTING APPARATUS AND RELATED METHOD OF OPERATION

[75] Inventor: David R. Pearl, West Hartford, Conn.

[73] Assignee: Gerber Garment Technology, Inc., Tolland, Conn.

[21] Appl. No.: 817,432

[22] Filed: Jan. 9, 1986

[51] Int. Cl.$^4$ .......................... G01D 9/40; G01D 9/30
[52] U.S. Cl. .................................. 364/519; 346/139 R; 364/520
[58] Field of Search ................................ 364/518–521; 346/139 R

[56] References Cited

U.S. PATENT DOCUMENTS

| | | | |
|---|---|---|---|
| 3,099,212 | 7/1963 | Sohn | 101/226 |
| 3,109,058 | 10/1963 | Luhn | 346/49 |
| 3,355,742 | 11/1967 | Staubli | 346/139 R |
| 3,529,084 | 9/1970 | Rich | 250/202 |
| 3,724,347 | 4/1973 | Gerber | 354/77 |
| 3,823,665 | 7/1974 | Davis et al. | 101/92 X |
| 3,924,532 | 12/1975 | Hubbard et al. | 101/219 X |
| 4,042,938 | 8/1977 | Germanowski et al. | 346/61 |
| 4,085,407 | 4/1978 | Stratbucker et al. | 346/33 ME |
| 4,151,536 | 4/1979 | Valin | 346/139 R |
| 4,157,552 | 6/1979 | Nakajima | 346/139 R |
| 4,184,261 | 1/1980 | Buerner | 33/18.1 |
| 4,247,214 | 1/1981 | Swan, Jr. | 400/705.1 |
| 4,293,863 | 10/1981 | Davis et al. | 346/75 |
| 4,346,445 | 8/1982 | Leuenberger et al. | 364/520 |
| 4,397,709 | 8/1983 | Schwenzer | 156/361 X |
| 4,401,996 | 8/1983 | Shirahata | 346/139 R |
| 4,435,674 | 3/1984 | Hevenor et al. | 318/640 |
| 4,500,890 | 2/1985 | Nicholas | 346/139 R |
| 4,577,206 | 3/1986 | Hibino | 346/139 R |
| 4,577,982 | 3/1986 | Sasaki | 346/139 R X |
| 4,627,748 | 12/1986 | Mizuno et al. | 346/139 R X |
| 4,642,779 | 2/1987 | Sawada | 346/139 R X |

FOREIGN PATENT DOCUMENTS 0125151 7/1984 European Pat. Off. .

*Primary Examiner*—Gary V. Harkcom
*Assistant Examiner*—H. R. Herndon
*Attorney, Agent, or Firm*—McCormick, Paulding & Huber

[57] ABSTRACT

A compound plotting apparatus for rapidly producing an annotated design comprises a symbol printing device such as a matrix printer for printing an annotation directly on a worksheet or on a label which is deposited on the worksheet and a design line drawing device such as a pen and actuator assembly. Both devices are mounted on a carriage translatable over a worksheet supporting surface. A controller is programmed to automatically select and activate the device more suitable to produce a type of mark, the symbol printing device to print annotations on the worksheet or on the label as the case may be and the design line drawing device to draw design lines on the worksheet.

21 Claims, 6 Drawing Sheets

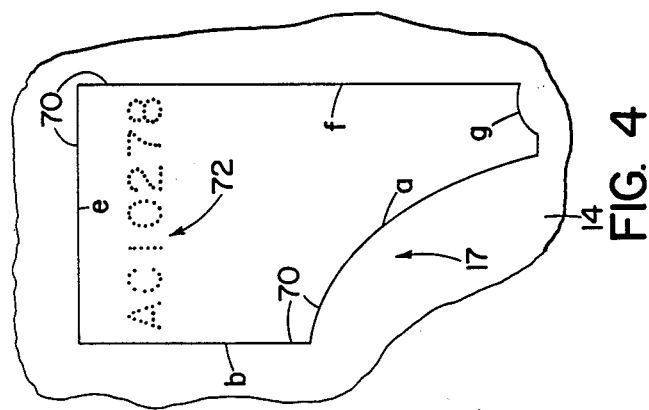
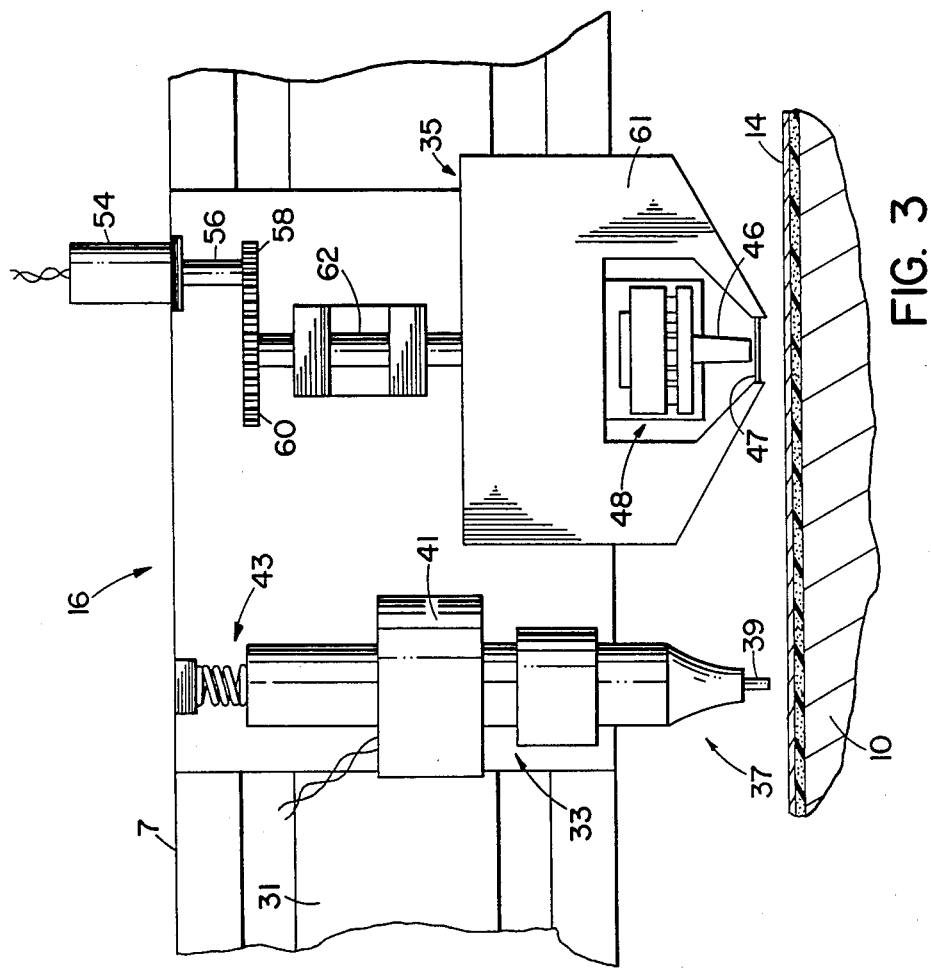

COMPOUND PLOTTING APPARATUS AND RELATED METHOD OF OPERATION

BACKGROUND OF THE INVENTION

The invention relates generally to plotting systems and deals more particularly with apparatus for rapidly producing an annotated design.

Plotters of the type with which this invention is concerned are used, for example, to outline or trace garment patterns with curved and straight design lines and to annotate the patterns with alphanumeric characters. Heretofore, a single inscribing device such as a standard line drawing device utilizing a pen, pencil or nondeflectable ink jet or a standard symbol printing device utilizing a matrix printer or a deflectable ink jet has been used in such plotters to produce both the design lines and the alphanumeric characters.

Each of the line drawing devices described above is specially adapted to draw large, sweeping lines and can do so rapidly; however, each is slow and cumbersome in drawing alphanumeric characters and other relatively small symbols because, to draw them, each line drawing device moves relative to the work-sheet along a path tracing them and in so moving, make many turns and repeatedly backtrack. Besides being slow in drawing such symbols, a plotting system utilizing a line drawing device is worn by the start-and-stop motion required to produce them.

A symbol printing device, such as one utilizing a matrix of impacting pins capable of inscribing a matrix of dots, is specially adapted for printing alphanumeric characters and other symbols because it can generate such symbols rapidly with one continuous sweep. However, most symbol printing devices produce unattractive design lines because the dots they produce are not continuous with one another leaving noticeable gaps. In addition, matrix printing devices are slower than line drawing devices in producing relatively large design lines because the impact rate of the printing pins is limited and the dots produced must be close enough to one another to produce a semblance of a line. Consequently, a plotting system utilizing only one type of inscribing device, either a line drawing device or a symbol printing device, is inefficient and slow in producing an inscription containing both design lines and alphanumeric characters or other symbols.

In U.S. Pat. No. 4,151,536, Valin discloses a plotting system utilizing a single, matrix printing device having two printing matrixes. One matrix consists of a single row of impactless printing electrodes which print alphanumeric characters and other symbols as the device is moved perpendicular to the row. The other matrix includes a circular arrangement of impactless printing electrodes centered about the row and operates in conjunction with the electrodes of the row to produce design lines, each of which design lines being denser and more continuous than a design line made from a single row of printing electrodes because dots produced by the circular matrix are made to overlap those produced by the row by appropriate movement of the device. Nevertheless, it is believed that a standard line drawing device produces design lines more rapidly and more attractively than the combined matrixes of '536.

A general aim of the invention is to provide a plotting system which is capable of rapidly producing an annotated design.

Another general aim of the invention is to provide a plotting system of the foregoing type which provides attractive design lines.

A more specific aim of the invention is to provide a plotting system of the foregoing type in which the design lines are continuous.

Still another general aim of the invention is to provide a plotting system capable of producing a type of mark with a suitably adapted plotting device.

Another specific aim of the invention is to provide a compound plotting system which includes means for providing an annotation, a line drawing means, and a control for automatically selecting and activating the annotation means to provide an annotation and the line drawing means to draw design lines.

Other aims and advantages of the invention will become apparent from the following detailed description and figures.

SUMMARY OF THE INVENTION

The invention resides in a compound plotting apparatus for rapidly producing an annotated design. The apparatus includes a symbol printing means for printing alphanumeric characters and other symbols directly on a worksheet or on a label. In the latter case, the apparatus also includes a label applicator. In either case, the apparatus further includes a line drawing means for drawing design lines. The system includes a control for automatically selecting and activating the symbol printing means to print symbols defined by symbol printing data and to apply a label if the annotation is printed on the label and for automatically selecting and activating the line drawing means to draw design lines defined by design line data.

BRIEF DESCRIPTION OF THE FIGURES

FIG. 3 is a schematic view of a compound plotting head of the plotting apparatus of FIG. 1.

FIG. 4 is a fragmentary plan view of a worksheet which has been inscribed by the plotting apparatus of FIG. 1.

DETAILED DESCRIPTION OF THE PREFERRED EMBODIMENTS

Figure 1:
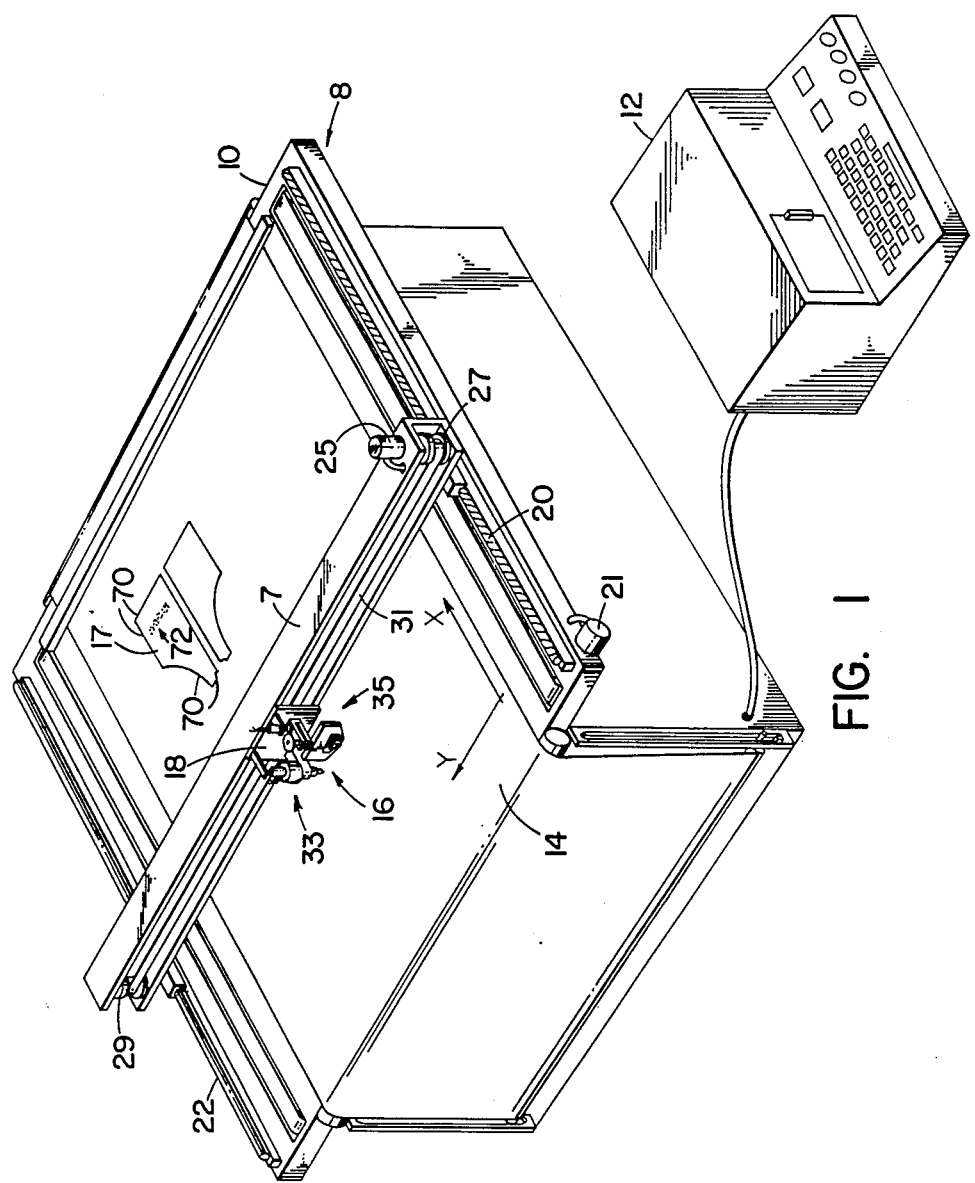
FIG. 1 is a perspective view of a compound plotting apparatus embodying the invention.

FIG. 1 illustrates a compound plotting apparatus generally designated 8 embodying the invention. The apparatus 8 includes a table 10 which supports a paper worksheet 14, and a compound plotting head 16 which is supported above the table for movement in a plane generally parallel thereto. The head is movable in an illustrated X-coordinate direction by a drive system including a sliding bridge 7, a lead screw 20 threadably received by the bridge, a guide bar 22 for the bridge and a stepping ("X") motor 21 for turning the lead screw. The head 16 is also movable in an illustrated Y-coordinate direction by means of a carriage 18 which supports the plotting head 16, a stepping ("Y") motor 25, a pulley 27 driven by the motor 25, a pulley 29, and a timing belt 31 supported between the pulleys 27 and 29, which belt is attached to the rear of the carriage 18 to drive it. Both stepping motors are controlled by a controller 12 which includes a computer. If desired, another motor, belt and pulley assembly may be substituted for the motor 21 and lead screw 20 to provide movement in the X-coordinate direction. For a further description of a machine capable of moving a head such as the inscribing head 16 in a plane parallel to a work surface, reference may be made to U.S. Pat. No. 3,529,084 to Rich, issued on Sept. 15, 1970, assigned to the assignee of the present invention and hereby incorporated by reference as part of the present disclosure.

The compound plotting head 16 comprises a symbol printing device or instrument 35 and a line drawing device or instrument 33.

Figure 2:
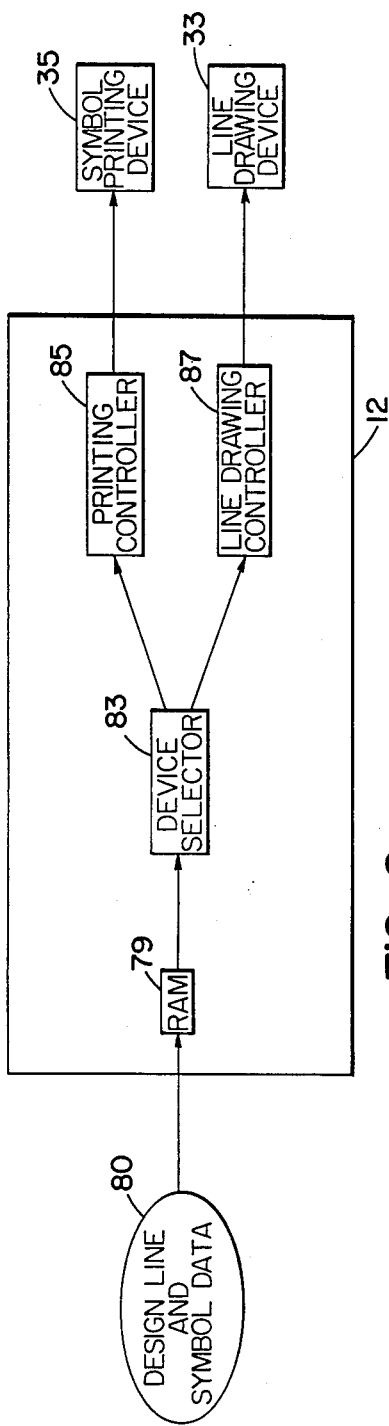
FIG. 2 is a block diagram of components of the plotting apparatus of FIG. 1.

As illustrated in FIG. 2, the controller 12 includes a Random Access Memory 79 for storing information 80 defining design lines to be drawn and symbols to be printed, a device selector 83 for initiating a symbol printing operation or a line drawing operation, a controller 85 for controlling the symbol printing device 35 and the X-Y motors in conjunction therewith, and a controller 87 for controlling the line drawing device 33 and the X-Y motors in conjunction therewith.

Figure 6:
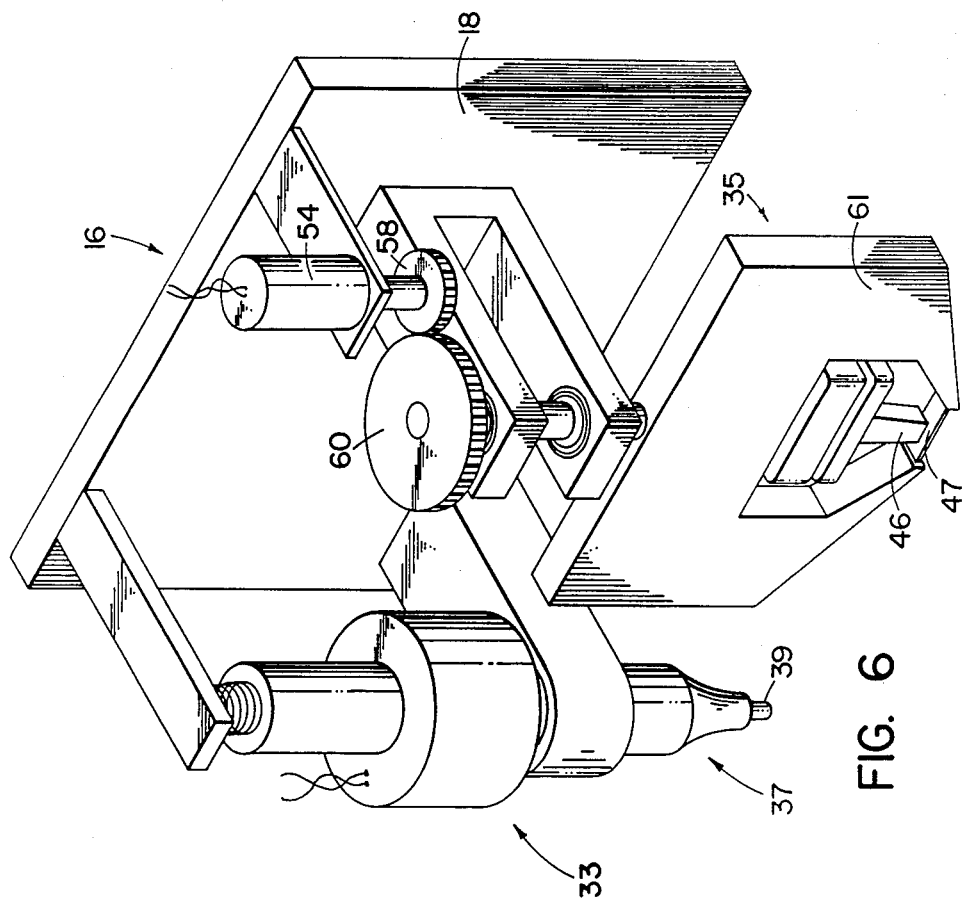
FIG. 6 is a perspective view of FIG. 2.

The line drawing device 33 and the printing device 35 are both fixedly mounted to the carriage 18 and, as shown more clearly in FIGS. 3 and 6, the line drawing device 33 includes a pen 37 having a drawing tip or nib 39 and an actuator 41. The actuator includes a piston and cylinder assembly which is under the control of the controller 12 for urging the pen downwardly into engagement with the worksheet, and a spring 43 for retracting the pen to an elevated or lifted position at which the pen tip 39 is out of contact with the worksheet 14. To draw design-type outlines 70,70 of an annotated garment pattern 17, the controller 12 directs the actuator 41 to lower the pen tip 39 into engagement with the worksheet 14 and the X-Y motors to move the line drawing device 33 along a course which outlines or traces the desired pattern with a visible marking substance such as ink. For a further discussion of such a drawing device, reference may be made to U.S. Pat. No. 4,435,674 to Hevenor, et al assigned to Gerber Scientific Instrument Company of South Windsor, CT, issued on Mar. 6, 1984 and hereby incorporated by references as part of the present disclosure.

Referring also to FIGS. 3 and 6, the printing device 35 includes a matrix of strikers or pins within a casing 46, which strikers are slidably mounted for movement perpendicular to the table 10 and are selectably activated by a hammer and solenoid assembly 48 which in turn is activated by the controller 12 to print alphanumeric characters or other symbols. A ribbon 47 providing a visible marking substance, ink or carbon, for the strikers is supported between the casing 46 and the worksheet 14 and by way of example, the matrix of strikers comprises nine strikers in a single row, 0.2 inches long. The casing 46, the hammer and solenoid assembly 48 and the ribbon 47 are supported within a housing 61.

The printing device 35 is rotatable about a vertical axis in relation to the carriage 18 by means of a stepping motor 54, a motor shaft 56, a gear 58 which is fixedly attached to the shaft, a gear 60 which is engaged and driven by the gear 58 and a shaft 62 which is fixedly attached to the axis of the gear 60 and to the housing 61. The stepping motor 54 is controlled by the controller 12 and hence, the controller 12 governs the printing angle of the printing device 35. To print alphanumeric characters, the controller 12 directs the motor 54 to rotate the printing device 35 such that the row of strikers is approximately parallel to a line passing vertically through each character, and then directs the X-Y motors to move the printing device 35 such that the row of strikers moves perpendicular to the line passing vertically through each character. In this manner, the characters are produced usually with one sweep of the printing device 35. If desired, additional rows of strikers may be included adjacent to the existing row so that one complete alphanumeric character may be produced simultaneously. This will expedite the printing process.

Figure 5:
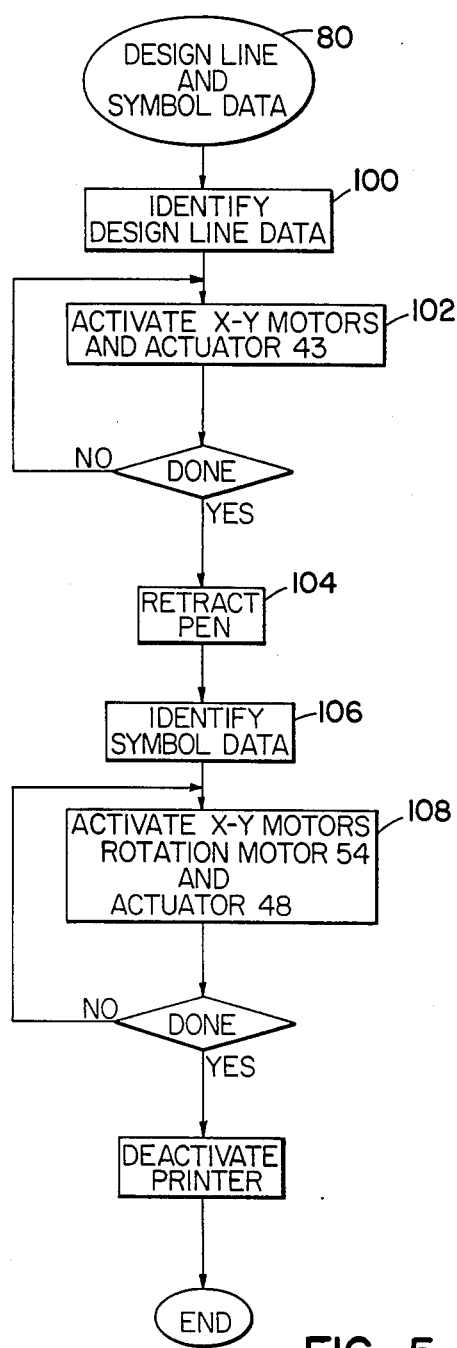
FIG. 5 is a flow chart illustrating a process by which the plotting apparatus of FIG. 1 operates.

As shown in FIGS. 1 and 4, the annotated garment pattern 17 includes an annotation 72 comprising design lines 70,70 outlining the pattern and alphanumeric characters inscribed within. The annotated garment pattern 17 was inscribed in the manner illustrated in FIG. 5. First, information 80 is entered into the controller 12, which information defines the shape and position of the design lines 70,70, and indicates that this information governs the line drawing device 33, and further defines the type, sequence, size and spacing of the alphanumeric characters of the annotation 72 and indicates that this latter information governs the symbol printing device 35. Later, the device selector 83 of the controller 12 identifies (step 100) the design line data, commands the X-Y carriage motors to properly position the pen 37, and then commands (step 102) the actuator 41 to lower the pen 37 into engagement with the worksheet 14 and the X-Y motors to move the pen 37 along the path of the design lines 70,70. Then the controller commands the actuator 41 to retract (step 104) the pen 37.

At another time, while the pen 37 is retracted, the device selector 83 of the controller 12 identifies (step 106) the symbol data and commands (step 108) the X-Y and rotation motors to properly position the row of strikers of the printing device 35, in this case, perpendicular to the center line of the annotation 72. Next, the controller commands (also step 108) the print head 35 to move in the X-coordinate direction and print the annotation. Hence, the controller 12 distributes, the plotting between the line drawing device 33 and the symbol printing device 35. The order of printing and drawing does not matter; and if desired, the printing and drawing operations may be interspersed. For example, the drawing device 33 may first be activated to draw the design lines 70,70 indicated as a and b, then retracted, then the printing device 35 activated to print the annotation 72, then de-activated, and finally the drawing device 33 re-activated to draw the design lines, indicated as e, f, and g. Such a routine minimizes the amount of travel required of the carriage 18 and so, saves time.

On some garment patterns, it may be desirable to provide very large symbols, for example six inches in height. In which case, it may be more efficient to draw the symbols with the line drawing device 33 instead of the symbol printing device 35 because the symbol printing device 35 would have to make several sweeps to print the symbol and in so doing, require more time than would be required by the line drawing device. Also, the line drawing device 33 would probably produce a more attractive symbol of this size. In the preferred embodiment of the invention, the device selector 83 of the computer 12 analyzes the data defining the large symbol and compares the height of the symbol with a size limit previously programmed into the computer. For example, the size limit may equal one or two times the height of the printing matrix provided by the matrix of striking pins of the printing device 35. If the height of the symbol exceeds the size limit, then the device selector 83 selects the line drawing device 33 to draw it, if not, the device selector 83 selects the symbol printing device 35 to print it. In summary, the computer 12 views large symbols as design lines.

Because the drawing device 33 is specially suited to draw the design line 70,70, it draws them rapidly and attractively, and because the printing device 35 is specially suited to draw the annotation 72, it prints it rapidly. Also, because the drawing device 33 and the printing device 35 are housed together within the plotting apparatus 8 within line drawing range and symbol printing range, respectively, of the worksheet 14, and the apparatus 8 is capable of automatically selecting and activating either one of the devices, the line drawing and symbol printing operations are expeditious.

The annotation provides such information as the portion, style and size of a garment that the pattern represents. After the worksheet 14 is fully inscribed, it may be placed over a layup of fabric sheets and the fabric sheets cut into pattern pieces by means of a cutting instrument which traces the design line 70,70.

Figure 7:
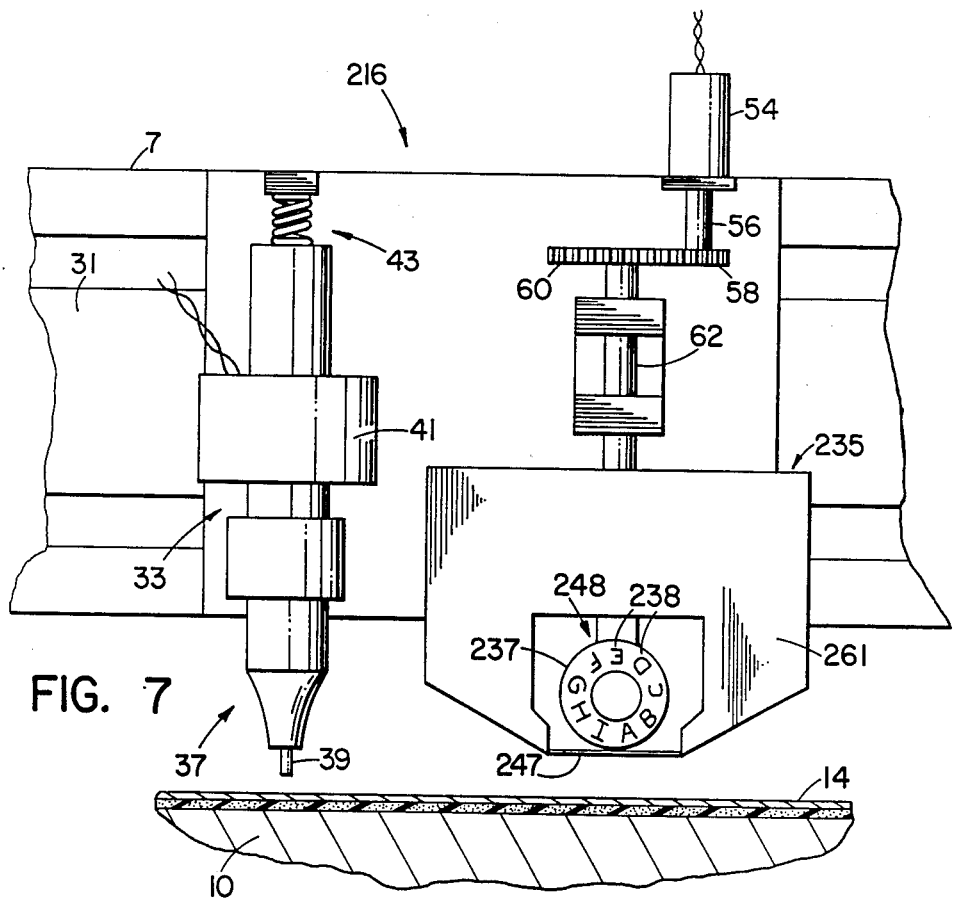
FIG. 7 is a schematic view of another compound plotting head which embodies the invention.

FIG. 7 illustrates a compound plotting head generally designated 216 which may substitute for the compound plotting head 16 in the system 8. The compound plotting head 216 includes the aforesaid line drawing instrument 33 and a symbol printing device 235. The symbol printing device 235 comprises an alphanumeric impact ball or core 237 such as commonly found in IBM Selectric II typewriters, which ball 237 contains protruding alphanumeric character shapes 238,238. The ball 237 is supported in a housing 231, which housing is supported for rotation about a verticle axis by the aforesaid stepping motor 54, shaft 56, gears 58 and 60 and shaft 62. The symbol printing device 235 also includes a ribbon 247 and a driver 248 which is capable of positioning the ball to expose any one of the alphanumeric characters 238,238 and driving the ball downwardly against the ribbon 247 and the worksheet 14 to produce an alphanumeric character.

To operate the compound plotting head 216, the symbol printing device 235 is positioned over a portion of the worksheet 14 associated with a pattern or other design to print a desired annotation. Then, the alphanumeric characters are printed one by one as the X and Y motors move the symbol printing device 235 to successive locations as the symbol printing device 235 prints successive alphanumeric characters in the annotation.

Figure 8:
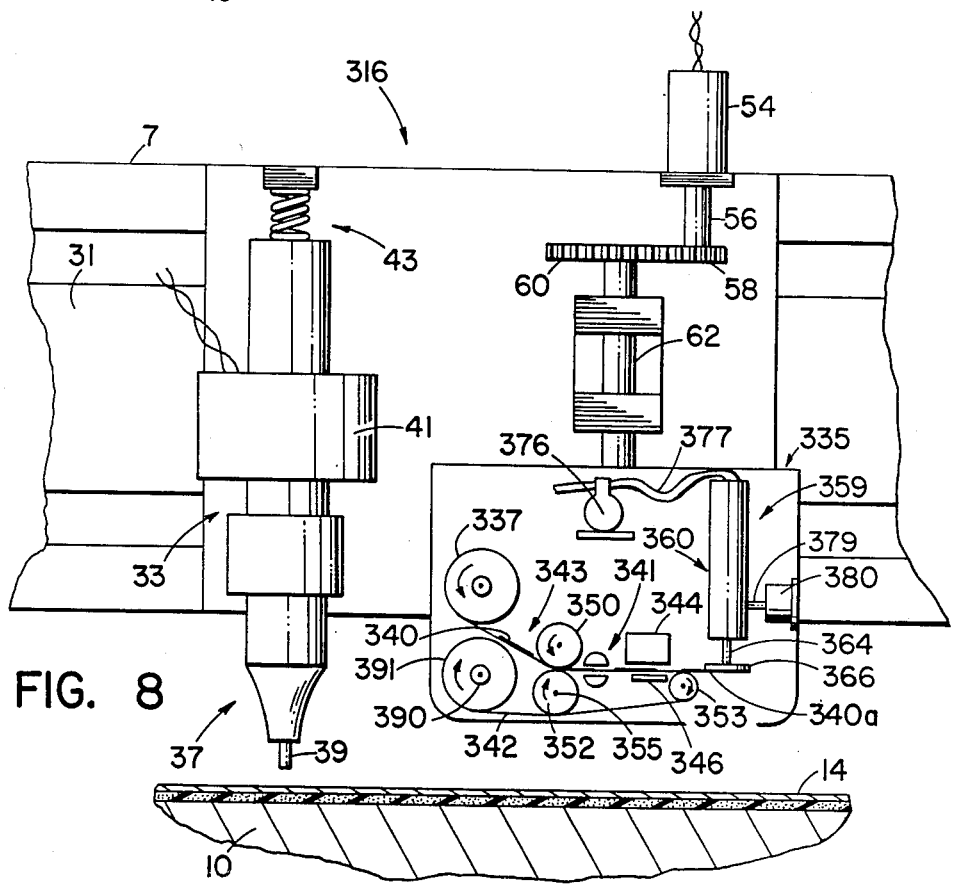
FIG 8. illustrates a compound platting head.

FIG. 8 illustrates a compound plotting head generally designated 316 which may substitute for the compound plotting head 16 in the system 8. The compound plotting head 316 includes the aforesaid line drawing instrument 33 and a label printer and applicator instrument 335 for annotating a pattern or other design.

The label printer and applicator 335 comprises a rotably mounted, takeoff reel 337 which holds web material 343. The web material comprises blank, opaque and relatively stiff labels 340,340 on a transparent and flexible carrier strip 342. The labels have a gummed back and the carrier strip 342 is smooth so that the labels are releasably attached and easily peeled from the carrier strip 342. By way of example, the peelable carrier strip comprises milar film.

The web material is pulled from the reel 337 by a feedwheel 352 which is driven by a computer controlled stepping motor 355. The feedwheel 352 frictionly engages the web material 343 by pressing it against a rotably mounted support wheel 350.

After departure from the reel 337, the web material 343 passes between a light emitting portion and a light sensitive portion of a photoelectric eye 341 which detects the location of the labels and conveys this information to the controller 12 so that the controller can register the labels with a printer 344 and an applicator 359. Then, each of the labels 340,340 passes between the printer 344 and a printing support plate 346. The printer may comprise any of the aforementioned symbol printing devices, i.e., the matrix printer, a typing alphanumeric ball or core, ink jet, etc. and is under the control of the controller 12. Other types of label printers are disclosed in U.S. Pat. Nos. 3,099,212 to Sohn which issued July 30, 1963; 3,823,665 to Davis which issued July 16, 1974; and 3,924,532 to Hubbard which issued Dec. 9, 1975. These patents are hereby incorporated by reference as part of the present disclosure. The controller 12 directs the printer 344 to print the appropriate annotation on the label in accordance with a destiny pattern piece.

During operation of the compound plotting head 316, the labels 340,340 may be printed while or before the line drawing device 343 draws the design lines and partially, if necessary, during the time it takes to position the label printer and applicator 335 so that no time is wasted during the printing of the labels. After a pattern has been outlined, the head 316 is positioned by appropriate motion of the X and Y stepping motors and the stepping motor 54 so that the label 340a is properly oriented over or adjacent to the pattern piece.

Next, the web material 343 is drawn around a roller 353 by a motor 390 which drives a take-up reel 391 for the scrap, carrier strip 342. The motor 390 is less powerful than the stepping motor 355 so that the stepping motor 355 controls the feed rate. The roller 353 has a relatively small diameter causing the carrier strip 342 to make a sharp reversal of direction. Because the labels 340,340 are relatively stiff and are only lightly held to the carrier strip 342 by their gummed backing, the leading label peels from the carrier 342 at the point of reversal as illustrated by the label 340a. A piston rod 364 of a piston and cylinder assembly 362 is retracted to the position shown in FIG. 8 before the arrival of the label. The piston rod 364 has a longitudinal bore and carries a tamper 366 which also has a bore aligned with the bore in the piston rod. A reversible pump 376 is coupled to the bores in the piston rod and tamper via a slack flexible hose 377. When the label 340a arrives beneath the tamper 366, the controller 12 actuates the pump 376 to vacuate the piston rod 364 and thereby suctionally capture the label 340a. The piston and cylinder assembly 362 is supported for horizontal movement by a piston and cylinder assembly 380. Next a piston rod 379 of the piston and cylinder assembly 380 is retracted drawing the assembly 362 and the label 340a it holds away from the carrier strip 342 and after retraction, the piston rod 364 is extended to force the tamper 366 and the label 340a downwardly against the worksheet. Then, in some applications the pump 376 is reversed to force air downwardly through the piston rod 364 and against the top surface of the label 348 to release the label 340a, which label adheres to the worksheet by the gum on its undersurface. For other applications, the pump 376 need only be shut off at this point to release the label 340a. Then, in either type of application, the piston rod 364 is retracted and the piston rod 379 extended to begin another cycle.

If desired, during the process of drawing the design lines of a pattern, if the labeling instrument 335 comes near a suitable location for the label, then the label may be applied to further expedite the labeling process. In such a case, after the label is applied, the line drawing device 33 resumes drawing the appropriate design lines.

Another type of label applicator is shown in U.S. Pat. No. 4,397,709 to Schuenter which patent issued Aug. 9, 1983 and is hereby incorporated by reference as part of the present disclosure.

It should be emphasized that the system 316 is extremely fast in producing annotated patterns because the line drawing device 33 is suited to draw the design lines rapidly, no additional time is utilized to print the annotated information on the labels 340,340 and little time is required to position and apply the labels 340,340.

If desired, preprinted labels in known order can be utilized in the labeling instrument 335 and the printer 344 deactivated or omitted.

By the foregoing, compound plotting apparatus have been disclosed embodying the present invention. However, numerous modifications and substitutions may be made without deviating from the scope of the invention. For example, various line drawing devices may be substituted for the line drawing device 33 such as a drawing device utilizing an ink jet or one utilizing a pencil. Also, if desired, the matrix type printing device 35 may be replaced by an electrostatic, impactless matrix printer. Furthermore, a printing device which utilizes a deflectable ink jet may substitute for the printing device 35 because such a deflectable ink jet printer is suitable to print alphanumeric characters and other symbols rapidly in a single sweep of the printing head.

Also, if desired, the line drawing device 33 may be mounted on one carriage such as the carriage 18 on one side of the bridge 17 and the symbol printing device 35 mounted on another carriage on the other side of the bridge and possibly operated simultaneously at times. Therefore, the invention has been disclosed by way of illustration and not limitation.

I claim:

1. A compound plotting apparatus for rapidly producing an annotated design on a worksheet, said apparatus comprising:
   means defining a support surface for supporting a worksheet,
   annotation means for providing said worksheet with an annotation containing symbols printed with a visible marking substance,
   said annotation means being rotatable about an axis perpendicular to said support surface for placing the annotation at selectively different angles relative to the support surface,
   line drawing means separate from said annotation means for drawing design lines on said worksheet with a visible marking substance, and
   means supporting said annotation means and said line drawing means for automatically moving said annotation means and said support surface relative to one another to position said annotation means to provide said worksheet with said annotation and for automatically moving said line drawing means and said support surface relative to one another to maneuver said line drawing means to draw said design lines on said worksheet.

2. A compound plotting apparatus as set forth in claim 1 wherein said annotation means comprises a means for applying a label to said worksheet.

3. A compound plotting apparatus as set forth in claim 2 wherein said annotation means comprises symbol printing means for printing an annotation on said label.

4. A compound plotting apparatus as set forth in claim 3 further comprising:
   means for inputting data defining said annotation to be provided and data defining said design lines to be drawn,
   selector means for distinguishing said data defining said annotation from said data defining said design lines,
   first controller means for determining a line drawing route for said line drawing means based on said data defining said design lines and for activating said line drawing means to draw said design lines, and
   second controller means for activating said symbol printing means to print said annotation on said label based on the annotation data before said line drawing means completes the drawing of said design lines, and for activating the supporting and moving means to move the label applicator means to a location associated with said design.

5. A compound plotting apparatus as set forth in claim 3 further comprising:
   means for inputting data defining said annotation to be provided and data defining said design lines to be drawn,
   selector means for distinguishing said data defining said annotation from said data defining said design lines,
   first controller means for determining a line drawing route for said line drawing means based at least in part on said data defining said design lines and for activating said line drawing means to draw said design lines, and
   second controller means for activating the supporting and moving means to position the label applicator means at a location associated with said design and for activating said symbol printing means to print said annotation on said label based on the annotation data before said supporting and moving means positions said label.

6. A compound plotting apparatus as set forth in claim 1 wherein the means supporting said annotation means and said line drawing means includes means for mounting said annotation means and said line drawing means concurrently in movable relation to said support surface.

7. A compound plotting apparatus as set forth in claim 1 wherein said annotation means comprises symbol printing means for printing symbols with said visible marking substance directly on said worksheet.

8. A compound plotting apparatus as set forth in claim 1 wherein said symbol printing means comprises a matrix printer.

9. A compound plotting apparatus as set forth in claim 8 wherein said line drawing means comprises a pen and actuator assembly.

10. A compound plotting apparatus for drawing a pattern on a worksheet and providing an annotation on the pattern, said apparatus comprising:
    means defining a support surface for supporting said worksheet, line drawing means for drawing design lines which outline said pattern on said worksheet with a visible marking substance, symbol printing means for printing an annotation on a label, applicator means for depositing said label on said worksheet, and means supporting said applicator means and said line drawing means for automatically moving said applicator means and said support surface relative to one another to position said applicator means to deposit said label at a location on said worksheet associated with said pattern and for automatically moving said line drawing means and said support surface relative to one another to draw design lines.

11. A method for rapidly producing an annotated design on a worksheet, said method comprising the steps of:

providing a compound plotting head comprising line drawing means for drawing design lines of the design, a symbol printing means for printing the annotation on a label, and application means for depositing the annotated label on the worksheet, automatically activating and moving said line drawing means to draw said design lines on said worksheet, and before said line drawing means completes drawing said design lines, automatically activating and moving said symbol printing means to begin printing said annotation on said label.

12. A method as set forth in claim 11 further comprising the step of applying said label to a region of said worksheet associated with said design.

13. A method as set forth in claim 11 further comprising the steps of inputting to a computer given data defining said annotation and said design, within said computer separating said given data into data defining said annotation and data defining said design, using said data defining said design to control said line drawing means, and using said data defining said annotation to control said symbol printing means.

14. A compound plotting apparatus for printing symbols and drawing design lines on a worksheet, said apparatus comprising:

means defining a support surface for supporting said worksheet, symbol printing means for printing symbols on said worksheet with a visible marking substance, line drawing means separate from said symbol printing means for drawing design lines on said worksheet with a visible marking substance, support means for supporting said symbol printing means relative to said support surface such that said symbol printing means is movable relative to said sheet material to automatically print said symbols on command, said symbol printing means further being mounted rotatably with said support means about an axis perpendicular to said support surface for placing the symbols at selectively differing angles relative to the support surface, said support means further supporting said line drawing means relative to said support surface such that said line drawing means is movable relative to said sheet material to automatically draw said design lines on command, drive means for moving said symbol printing means relative to said support surface and for moving said line drawing means relative to said support surface, and control means for commanding said drive means to move said symbol printing means along a symbol printing route and for commanding said drive means to move said line drawing device along a line drawing route.

15. A compound plotting apparatus for printing symbols and drawing design lines on a worksheet, said apparatus comprising:

means defining a support surface for supporting said worksheet, symbol printing means for printing symbols on said worksheet with a visible marking substance, line drawing means separate from said symbol printing means for drawing design lines on said worksheet with a visible marking substance, and means supporting said symbol printing means and said line drawing means for automatically moving said symbol printing means and said support surface relative to one another to position said symbol printing means to print symbols and for automatically moving said line drawing means and said support surface relative to one another to draw design lines, said symbol printing means further being mounted rotatably with said means supporting said symbol printing and line drawing means about an axis perpendicular to said support surface for placing the symbols at selectively different angles relative to the support surface.

16. A compound plotting apparatus as set forth in claim 15 wherein said line drawing means comprises a pen and actuator assembly.

17. A compound plotting apparatus as set forth in claim 16 wherein said symbol printing means comprises a matrix printer.

18. A compound plotting apparatus as set forth in claim 15 wherein said symbol printing means comprises a typing ball having protruding character shapes.

19. A method for printing symbols and drawing design lines on a worksheet, said method comprising the steps of:

inputting data to a computer, said data defining symbols to be printed and design lines to be drawn, after said data is inputted to said computer, distinguishing said data defining said symbols from said data defining said design lines, automatically activating and moving in a both rotational and linear manner a symbol printing device according to said data defining said symbols to print said symbols in a selected orientation on said worksheet with a visible marking substance, and automatically activating and moving a line drawing device according to said data defining said design lines to draw said design lines on said worksheet with a visible marking substance.

20. A method for printing symbols and drawing design lines as set forth in claim 19 wherein said symbol printing device and said line drawing device move simultaneously in relation to said worksheet, said symbol printing device being activated to print said symbols while said line drawing device is de-activated, and said line drawing device being activated to draw said design lines while said symbol printing device is de-activated.

21. Apparatus for generating plots with distributed plotting functions said apparatus comprising:

support means for holding a sheet of plotting material to receive marks during a plotting operation;

a first selectively operable marking instrument for inscribing in the sheet of plotting material line traces corresponding to the movements of the first instrument and material relative to one another;

a second selectively operable marking instrument for providing on the sheet of plotting material symbols with configurations unrelated to the movements of the second instrument and the material relative to one another;

said first and said second selectively operable marking instruments being supported by said support means;

said second marking instrument being rotatably mounted to said support means about an axis perpendicular to said supported sheet;

drive means for moving the first and second marking instruments relative to the supported sheet of plotting material during a plotting operation;

data means defining a plot containing both lie trace portions and symbol portions; and control means connected with the drive means, the first and second selectively operable marking instruments, and the data means for controlling the movements and operations of the first and second marking instruments on the plotting material and distributing the plotting functions between the instruments in accordance with the capability of the instrument to produce the line trace or symbol portions of the plot.

* * * * *